United States Patent Office 3,031,106
Patented Apr. 24, 1962

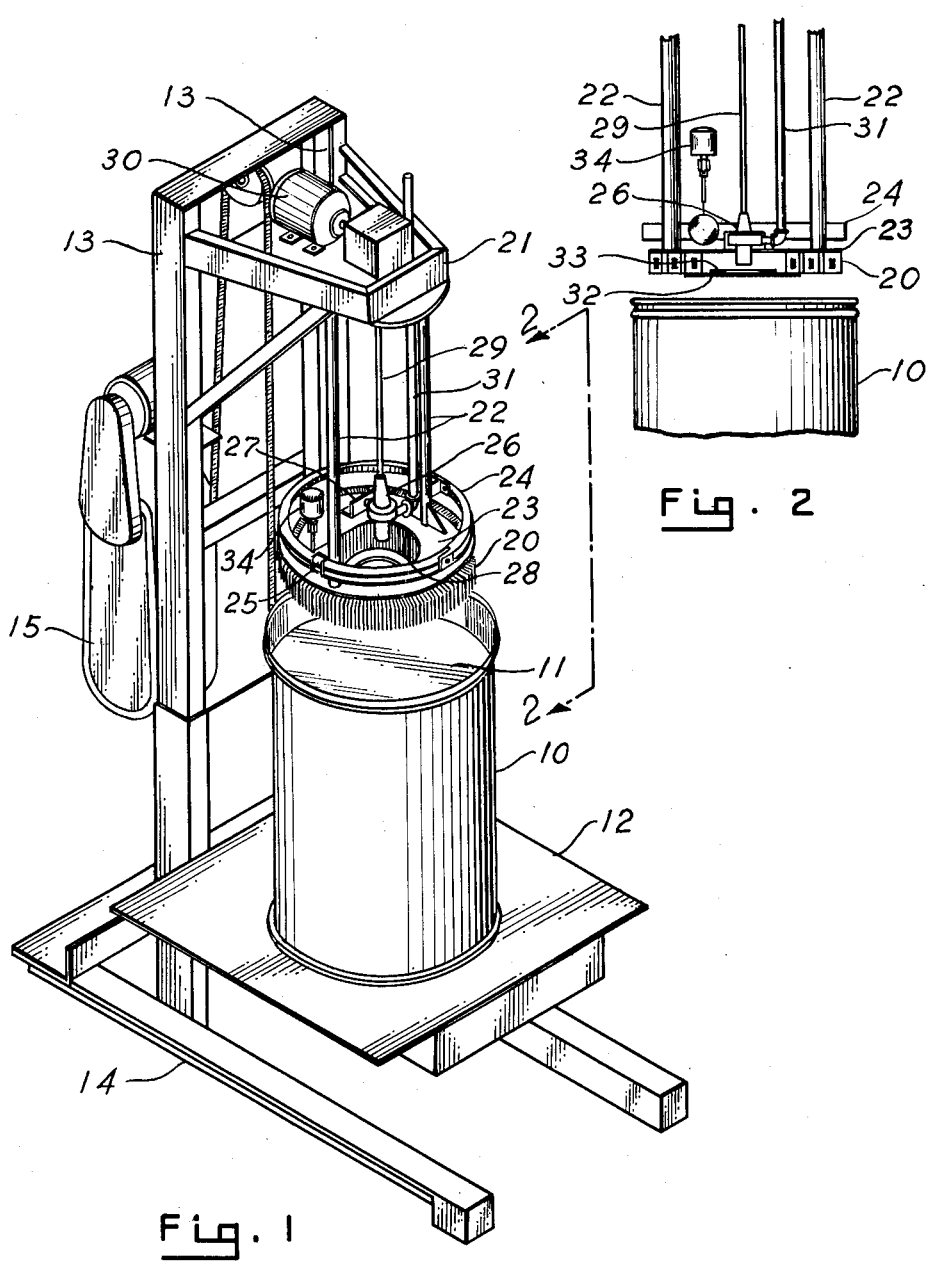

3,031,106
APPARATUS AND PROCESS FOR TRANSFERRING RESINOUS MATERIALS
Thomas Hooker, Youngstown, N.Y., assignor to Hooker Chemical Corporation, Niagara Falls, N.Y., a corporation of New York
Filed June 9, 1959, Ser. No. 819,080
2 Claims. (Cl. 222—146)

This invention relates to an apparatus and process for transferring resinous material from a reservoir such as a shipping container by transforming said material to a preferred state of fluidity by application of heat and transferring said material while in a fluid state.

It is highly desirable to be able to transfer resinous materials directly from the shipping container. This has been accomplished heretofore by external heat provided by thaw houses or heating jackets. This method has proven undesirable due to time, space and cost considerations. Furthermore, where constant material temperature is required, several days inventory must be maintained in heated storage to allow for slow heat penetration to the center of the viscous mass. Thermal damage can and frequently does occur during this prolonged exposure.

An alternative has been batch melting equipment, i.e., removal of the material from the shipping container, separation into small batches, and transferring to a heated reservoir for melting. This method, too, has proven undesirable. Removal from the shipping container is expensive and time consuming, especially if a solid material is involved. Furthermore, when the material is melted, considerable quantities of air are entrained in the melt. This air is quite difficult to remove, but unless expelled causes metering errors. In addition, foreign materials from the tools or containers used can be introduced into the melt which frequently jam the close-running clearances of the metering pump.

It is, therefore, an object of the present invention to provide an apparatus and process for transferring resinous material directly from the shipping container.

It is a further object of the present invention to provide an apparatus which proceeds expeditiously, which does not utilize excessive facilities, and which is inexpensive.

It is a further object to provide an apparatus which does not cause thermal damage to the material.

It is a still further object to provide an apparatus which avoids air entrainment and introduction of foreign materials.

It is a still further object to provide an apparatus for continuously transferring and accurately metering resinous material directly from the shipping container at a constant temperature and constant rate of delivery.

In accordance with the present invention, an apparatus has been found which accomplishes the aforementioned objects comprising in combination a heating element, means for bringing the resinous material into heating relationship with the heating element (preferably contacting relationship) and pumping means in spaced relationship to the heating element suitable for transferring the fluid material, said pumping means arranged in such a manner that when the resinous material is transformed to a state of fluidity by the heating element, the pump suction is immersed in the fluid material. By the use of the apparatus of the present invention in accordance with the process of the present invention, solvent thinning may often be avoided with its attendant fume and safety hazards.

In order that the invention may be more easily understood, it will be described with reference to the attached drawings. FIGURE 1 is a side elevation of the apparatus of the present invention. FIGURE 2 is a vertical sectional view along line 2—2 of FIGURE 1.

Referring to FIGURE 1, shipping container 10 with the cover removed (i.e., open head) containing resinous material 11 rests on elevator platform 12 supported by any suitable supporting structure such as upright channel members 13 mounted on base 14. Hoist 15 controls the up and down movement of the platform. Any suitable means may be used to raise and lower the platform depending on specific requirements, such as counter-weights, motors, hydraulic or pneumatic cylinders, or manually. By resinous materials, it is meant any thermoplastic material which is not readily flowable at ambient temperatures and which can be more easily handled by the application of heat, such as plastic materials, asphalt, glue, heavy molasses, paints, varnishes, caulking compounds, putty, and resinous or bituminous roofing or coating materials. Generally speaking, this invention contemplates by resinous materials, those having high ambient temperature consistencies which make them difficult or impossible to pump at the desired rate. Especially suitable are resin ingredients for polyurethane foam systems for which viscosities and temperatures must be accurately controlled, i.e., the reaction products of a polycarboxylic acid and a polyhydric alcohol. An example is the alkyd resins disclosed in United States Patent 2,865,869, the disclosure of which is incorporated herein by reference.

Heating element 20 is suspended from the horizontal extension of the upright channel member 21 by means of support tubes 22 connected to support disc 23. In operation, the shipping container is placed upon the elevator platform and the platform raised, elevating the shipping container until the resinous material is brought into heating relationship with the heating element and preferably pressed against the heating element. Continued application of heat and continued pressure against the heating element progressively transforms the upper portion of the resinous material forming a pool of molten material around the heating element. In order to provide greater heating surface, allow better heat transfer and attain closer temperature control, it is preferred to use a heating element annular in shape corresponding to the shape of the shipping container and slightly less in diameter, and also flat bottomed and extended surfaced, such as shown in the attached drawings.

The heating element should be fixed for convenience due to the many connections extending thereto; however, the present invention contemplates moving either the heating element or the platform or both. Care should be taken to make the connections to the heating element long enough to enable the heating element to reach the material at the bottom of the shipping container.

Optionally, an auxiliary heating element 24 may be provided directly above the main heating element fixedly connected to the heating element support tubes 22 by studs 25. The auxiliary heating element should be annular, have an aperture therein, and extend slightly beyond the outer portion of the main heating element in order to transform residual resinous material from the walls of the shipping container to a state of fluidity. Any suitable heating means may be used for either the main heating element or the auxiliary heating element, such as electric heat, vapor heat, or recirculated fluid heat.

When accurate temperature control is significant, thermostatic control of the heating element must be provided.

A pump 26 is mounted on pump support 27 with its suction in fixed relationship to the bottom of and within an aperture 28 of the heating element 20 and driven by means of pump shaft 29 and motor 30 operated by any suitable means such as pneumatically, hydraulically or electrically. It is critical to the present invention that the pump suction be arranged in such a manner that when the resinous material is transformed to a state of fluidity by the heating element, the pump section is immersed in the heated fluid material. In the embodiment exemplified in the attached drawings, the pump suction is fixed within the axial aperture of the heating element; thus, when the heating element sinks into the resinous material progressively forming a fluidized pool above the heating element, the pump suction is automatically immersed in the fluidized pool. When the pump suction is sufficiently submerged to avoid air entrainment, the pump is started and the fluid material delivered by the pump discharge tube 31 to the desired location at a rate up to the melting capacity of the heating element or momentarily to the discharge capacity of the pump. The pump discharge tube may be heated if desired. Whether or not the pump discharge tube is heated depends on specific conditions, such as temperature of the fluid and heat loss from the piping. The heating may be accomplished by either internally or externally heating the pump discharge tube by electrical, vapor or fluid heating means.

To facilitate pumping when viscous materials are involved, it is desirable to maintain the pump suction lines as short as possible and the pump suction opening as large as possible; hence it is preferable to immerse the entire pump in the fluidized material as well as the pump suction. This not only keeps the suction lines short, but keeps the pump warm and minimizes air entrainment, thereby facilitating priming.

Disc 32 may be provided at the bottom of the aperture of the heating element. This prevents cold material from by-passing the heating element and entering the pump. An optional ring heater 33 may be employed where solid materials are involved.

A pump level control 34 may be provided to prevent pump operation with inadequate submergence. A second level control (not shown) may be used to limit the depth of immersion of the heating element and pump and to prevent freezing or stiffening of the material over the heating element. The pump level control and the heating element level control may be combined if desired. These controls would operate on the level of the fluidized pool.

Any pumping means may be utilized provided that it is capable of transferring the fluid material. It is preferable to use a constant delivery type pump such as gear or vane type pumps, i.e., where every revolution or stroke of the pump sends out a given amount of material, as this would avoid a second metering device. Where specific requirements do not necessitate constant flow metering, a reciprocating, centrifugal, or turbine type pump is satisfactory.

The residue remaining on the bottom of the shipping container may be poured into the top of a fresh container, thus providing a fluidized reservoir from which to commence operations immediately, and minimizing residue waste.

Although the limitations of the present invention have been described, similar modifications and variations will suggest themselves to persons skilled in the art upon reading this disclosure. These are intended to be comprehended within the spirit of this invention.

I claim:

1. An apparatus for transferring and metering resinous material directly from the shipping container by transforming said material to a state of fluidity by application of heat and transferring said material while in the fluid state comprising in combination movable platform means for supporting the shipping container, an annular fixed, extended surface, heating element having an aperture therein, adjustable means for bringing the resinous material into contacting relationship with the heating element by elevating the platform means in such a manner that the heating element presses downwardly upon the resinous material, and constant delivery positive displacement pumping means with its suction within the aperture of the heating element in fixed relationship to the bottom of the heating element arranged in such a manner that when the resinous material is transformed to a state of fluidity the pumping means is immersed in the fluid material; said extended surface heating element functioning to prevent overheating of the fluid material and thereby permitting said pumping means to be used as a metering means.

2. An apparatus for transferring and metering resinous material having high ambient temperature consistency directly from the shipping container by transforming said material to a state of fluidity by application of heat and transferring said material while in the fluid state comprising in combination movable platform means for supporting the shipping container, an annular, flat bottomed, extended surfaced, thermostatically controlled fixed heating element having a disc covered aperture therein, adjustable means for bringing the resinous material into contacting relationship with the heating element by elevating the platform means in such a manner that the heating element presses downwardly upon the resinous material, constant delively positive displacement pumping means with its suction within the aperture of the heating element in fixed relationship to the bottom of the heating element arranged in such a manner that when the resinous material is transformed to a state of fluidity the pumping means is immersed in the fluid material, an annular auxiliary heating element having an aperture therein, said auxiliary heating element being in fixed relationship above the heating element extending slightly beyond the outer portion thereof adapted to transform residual resinous material from the walls of the shipping container to a state of fluidity, and means provided in the fluid pool for automatically regulating the level of the heating element in the fluid material.

References Cited in the file of this patent
UNITED STATES PATENTS
2,522,562     Von Hasse _____ Sept. 19, 1950